(12) United States Patent
Kawamura et al.

(10) Patent No.: US 11,756,736 B2
(45) Date of Patent: *Sep. 12, 2023

(54) MANUFACTURING METHOD OF CERAMIC POWDER

(71) Applicant: TAIYO YUDEN CO., LTD., Tokyo (JP)

(72) Inventors: Chie Kawamura, Takasaki (JP); Kazumichi Hiroi, Takasaki (JP); Osamu Hattori, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 35 days.

This patent is subject to a terminal disclaimer.

(21) Appl. No.: 17/501,817

(22) Filed: Oct. 14, 2021

(65) Prior Publication Data

US 2022/0037088 A1     Feb. 3, 2022

Related U.S. Application Data

(62) Division of application No. 16/882,342, filed on May 22, 2020, now Pat. No. 11,177,073, which is a
(Continued)

(30) Foreign Application Priority Data

Jun. 24, 2016   (JP) .................. 2016-125825

(51) Int. Cl.
    *C04B 35/468*    (2006.01)
    *H01G 4/12*      (2006.01)
    (Continued)

(52) U.S. Cl.
    CPC ............. *H01G 4/30* (2013.01); *B32B 18/00* (2013.01); *C01G 23/006* (2013.01);
    (Continued)

(58) Field of Classification Search
    CPC .................................................. C04B 35/4628
    See application file for complete search history.

(56) References Cited

U.S. PATENT DOCUMENTS 4,283,753 A    8/1981   Burn
5,065,274 A    11/1991  Berghout et al.
(Continued)

FOREIGN PATENT DOCUMENTS

JP    H03187975 A    8/1991
JP    H10330160 A    12/1998
(Continued)

OTHER PUBLICATIONS

A Notification of Reason for Refusal issued by Korean Intellectual Property Office, dated May 13, 2021, for Korean counterpart application No. 1020170077858. (5 pages).

(Continued)

*Primary Examiner* — Karl E Group
(74) *Attorney, Agent, or Firm* — Law Office of Katsuhiro Arai (57) ABSTRACT

A manufacturing method of ceramic powder includes mixing a barium carbonate having a specific surface are of 15 $m^2/g$ or more, a titanium dioxide having a specific surface area of 20 $m^2/g$ or more, a first compound of a donor element having a larger valence than Ti, and a second compound of an acceptor element having a smaller valence than Ti and having a larger ion radium than Ti and the donor element, and synthesizing barium titanate powder by calcining the barium carbonate, the titanium dioxide, the first compound and the second compound until a specific surface area of the barium titanate powder becomes 4 $m^2/g$ or more and 25 $m^2/g$ or less.

4 Claims, 3 Drawing Sheets

Related U.S. Application Data division of application No. 16/155,623, filed on Oct. 9, 2018, now abandoned, which is a division of application No. 15/623,253, filed on Jun. 14, 2017, now abandoned.

(51) Int. Cl.
*H01G 4/30* (2006.01)
*B32B 18/00* (2006.01)
*C01G 23/00* (2006.01)
*C04B 35/626* (2006.01)

(52) U.S. Cl.
CPC .... *C04B 35/4682* (2013.01); *C04B 35/62655* (2013.01); *C04B 35/62685* (2013.01); *H01G 4/1218* (2013.01); *H01G 4/1227* (2013.01); *C01P 2002/34* (2013.01); *C01P 2002/50* (2013.01); *C01P 2002/72* (2013.01); *C01P 2002/88* (2013.01); *C01P 2006/12* (2013.01); *C04B 2235/3224* (2013.01); *C04B 2235/3239* (2013.01); *C04B 2235/3256* (2013.01); *C04B 2235/3258* (2013.01); *C04B 2235/3262* (2013.01); *C04B 2235/3267* (2013.01); *C04B 2235/3418* (2013.01); *C04B 2235/5296* (2013.01); *C04B 2235/5409* (2013.01); *C04B 2235/663* (2013.01); *C04B 2237/346* (2013.01); *C04B 2237/68* (2013.01)

(56) References Cited

U.S. PATENT DOCUMENTS

| | | | |
|---|---|---|---|
| 6,072,688 A | 6/2000 | Hennings et al. | |
| 6,359,327 B1 | 3/2002 | Niimi et al. | |
| 7,528,088 B2 | 5/2009 | Umeda et al. | |
| 9,666,371 B2 | 5/2017 | Morita et al. | |
| 11,177,073 B2 * | 11/2021 | Kawamura | H01G 4/1218 |
| 2001/0055193 A1 | 12/2001 | Chazono et al. | |
| 2002/0016247 A1 | 2/2002 | Mizuno et al. | |
| 2002/0177519 A1 | 11/2002 | Kawamoto et al. | |
| 2003/0012727 A1 | 1/2003 | Yoshikawa et al. | |
| 2005/0107241 A1 | 5/2005 | Umeda et al. | |
| 2007/0049485 A1 | 3/2007 | Tanabe et al. | |
| 2009/0086407 A1 | 4/2009 | Takahashi et al. | |
| 2010/0204034 A1 | 8/2010 | Umeda et al. | |
| 2012/0033343 A1 | 2/2012 | Yoon et al. | |
| 2013/0083450 A1 | 4/2013 | Yoon et al. | |
| 2014/0184878 A1 | 7/2014 | Watanabe et al. | |
| 2014/0268484 A1 | 9/2014 | Kang et al. | |
| 2016/0217924 A1 | 7/2016 | Morita et al. | |
| 2017/0032895 A1 | 2/2017 | Ogata et al. | |

FOREIGN PATENT DOCUMENTS

| | | |
|---|---|---|
| JP | 2001230150 A | 8/2001 |
| JP | 2009084112 A | 4/2009 |
| JP | 2011256091 A | 12/2011 |
| KR | 20020048100 A | 6/2002 |
| KR | 20020096978 A | 12/2002 |
| WO | 2005093763 A1 | 10/2005 |

OTHER PUBLICATIONS

A Notification of Reasons for Refusal issued by the Japanese Patent Office, dated Jan. 8, 2019, for related Japanese application No. 2016-125825 (3 pages).

Final Office Action issued by U.S Patent and Trademark Office, dated Feb. 24, 2020, for U.S. Appl. No. 16/155,623 (6 pages).

Non-Final Office Action issued by U.S. Patent and Trademark Office, dated Jul. 9, 2018, for U.S. Appl. No. 15/623,253 (12 pages).

Non-Final Office Action issued by U.S. Patent and Trademark Office, dated Nov. 8, 2019, for U.S. Appl. No. 16/155,623 (13 pages).

Notice of Allowance issued by U.S Patent and Trademark Office, dated Jul. 20, 2021, for U.S. Appl. No. 16/882,342 (19 pages).

* cited by examiner

MANUFACTURING METHOD OF CERAMIC POWDER

CROSS-REFERENCE TO RELATED APPLICATION

This application is a divisional of U.S. patent application Ser. No. 16/882,342, filed May 22, 2020, now U.S. Pat. No. 11,177,073, issued Nov. 16, 2021, which is a divisional of U.S. patent application Ser. No. 16/155,623, filed Oct. 9, 2018, now abandoned, which is a divisional of U.S. patent application Ser. No. 15/623,253, filed Jun. 14, 2017, now abandoned, which is based upon and claims the benefit of priority of the prior Japanese Patent Application No. 2016-125825, filed on Jun. 24, 2016, each disclosure of which is incorporated herein by reference in its entirety. Applicant herein explicitly rescinds and retracts any prior disclaimers or disavowals or any amendment/statement otherwise limiting claim scope made in any parent, child, or related prosecution history with regard to any subject matter supported by the present application.

FIELD

A certain aspect of the present invention relates to a manufacturing method of ceramic powder.

BACKGROUND

Recently, downsizing of electronic components is needed, as an electronic circuit used for digital electronic devices such as mobile phones and tablet terminals is highly densified. Therefore, downsizing and capacitance enlargement of the multilayer ceramic capacitors (MLCC) structuring the circuit is rapidly progressed.

The capacitance of the multilayer ceramic capacitor is proportional to dielectric constant of a material of the dielectric layer structuring the capacitor and the number of stacked dielectric layers, and is inversely proportional to a thickness of each dielectric layer. And so, in order to satisfy the demand of the downsizing, it is needed that the dielectric constant of the material is enlarged, the thickness of the dielectric layer is reduced, and the number of the stacked layers is increased.

However, when the dielectric layer becomes thinner, a voltage applied per unit thickness increases and the life time of the dielectric layer is reduced. Moreover, reliability of the multilayer ceramic capacitor is degraded. And so, in order to improve the life, it is supposed that Mo or W acting as a donor element is added to dielectric material.

Distribution of existence ratio of additive element such as the donor element in ceramic powder structuring the dielectric layer has an influence on property of the multilayer ceramic capacitor. For example, Japanese Patent Application Publication No. 10-330160 discloses dielectric porcelanic that is capable of improving insulation breakdown, in which an additive element such as Mn, V, Cr, Co, Ni, Fe, Nb, Mo, Ta, W or the like is evenly dispersed in all regions from grain boundary to grain center. In examples of the publication, barium carbonate, titanium oxide and the additive element are mixed and are calcined at 1200 degrees C. Another additive element is added, and the mixed materials are calcined in oxidizing atmosphere at 1000 degrees C. A green sheet is made with use of the resulting porcelanic material. The green sheets are stacked, and are baked for 2 hours at 1200 degrees C. And, a multilayer capacitor is formed by thermally treating the green sheets for 30 minutes in oxidizing atmosphere at 600 degrees C. Although it is expected that the distribution of the additive element in the dielectric porcelanic of the multilayer capacitor formed in this manner is even, the publication discloses that actually, there is a difference of 7 times between a grain boundary and center of a grain.

Japanese Patent Application Publication No. 2001-230150 discloses, as a multilayer ceramic capacitor having a small size and large capacitance without life degradation caused by insulation break down even if a thickness of dielectric layers is reduced and the dielectric layers are stacked, a multilayer ceramic capacitor that has ceramic grains having crystalline core to which an additive element such as Mn, V, Cr, Mo, Fe, Ni, Cu or Co is added and a shell surrounding the core, in which a concentration of these additive elements increases from the center of the core to the shell. In examples of the publication, barium carbonate, titanium oxide and the additive element are mixed and are calcined for two hours at 200 degrees C. And, barium titanate including the additive element is synthesized. Then, another additive element is added, and the mixed materials are calcined at 1000 degrees C. A green sheet is made with use of the resulting mixed material. The green sheets are stacked, and are calcined for 3 hours at 1130 degrees C. And, a multilayer capacitor is formed by sintering the green sheets for 30 minutes in oxidizing atmosphere at 600 degrees C. The publication discloses that, in the resulting multilayer ceramic capacitor, a concentration of the additive element of the core of the ceramic grain structuring the dielectric layer is approximately 290 ppm, and the concentration of the additive element of the shell is approximately 410 ppm.

Japanese Patent Application Publication No. 2011-256091 discloses barium titanate-based ceramic grains that have a core and a shell, include rare earth element R and M (at least one of Mg, Mn, Ni, Co, Fe, Cr, Cu, Al, Mo, W and V) as a sub component, in which total concentration of R and M has a gradient from a grain boundary to the core and a local minimum portion and a local maximum portion, as a dielectric ceramic that achieves a multilayer ceramic capacitor that has preferable capacitance-temperature property and has excellent life property.

SUMMARY OF THE INVENTION

However, when the distribution of the additive element in the ceramic grains has a high portion and a small portion, an amount of oxygen defect becomes larger in a low concentration portion, and the life property may be degraded. And so, it is thought that barium titanate solid-solving at least one of Mo, Ta, Nb and W and having a small concentration variability is used. However, these elements act as a donor element, and a leak current may be increased.

The present invention has a purpose of providing a manufacturing method of ceramic powder that is capable of improving life property of a dielectric layer and suppressing a leak current.

According to an aspect of the present invention, there is provided a manufacturing method of ceramic powder comprising: mixing a barium carbonate having a specific surface are of 15 $m^2/g$ or more, a titanium dioxide having a specific surface area of 20 $m^2/g$ or more, a first compound of a donor element having a larger valence than Ti, and a second compound of an acceptor element having a smaller valence than Ti and having a larger ion radium than Ti and the donor element; and synthesizing barium titanate powder by calcining the barium carbonate, the titanium dioxide, the first compound and the second compound until a specific surface area of the barium titanate powder becomes 4 m²/g or more and 25 m²/g or less, wherein: a solid solution amount of the donor element with respect to the barium titanate is 0.05 mol or more and 0.3 mol or less on a presumption that an amount of the barium titanate is 100 mol and the donor element is converted into an oxide; a solid solution amount of the accepter element with respect to the barium titanate is 0.02 mol or more and 0.2 mol or less on a presumption that the amount of the barium titanate is 100 mol and the acceptor element is converted into an oxide; and relationships y≥−0.0003x+1.0106, y≤−0.0002x+1.0114, 4≤x≤25 and y≤1.0099 are satisfied when a specific surface area of the ceramic powder is "x" and an axial ratio c/a of the ceramic powder is "y".

DETAILED DESCRIPTION

A description will be given of an embodiment with reference to the accompanying drawings.

Embodiment

Figure 1:
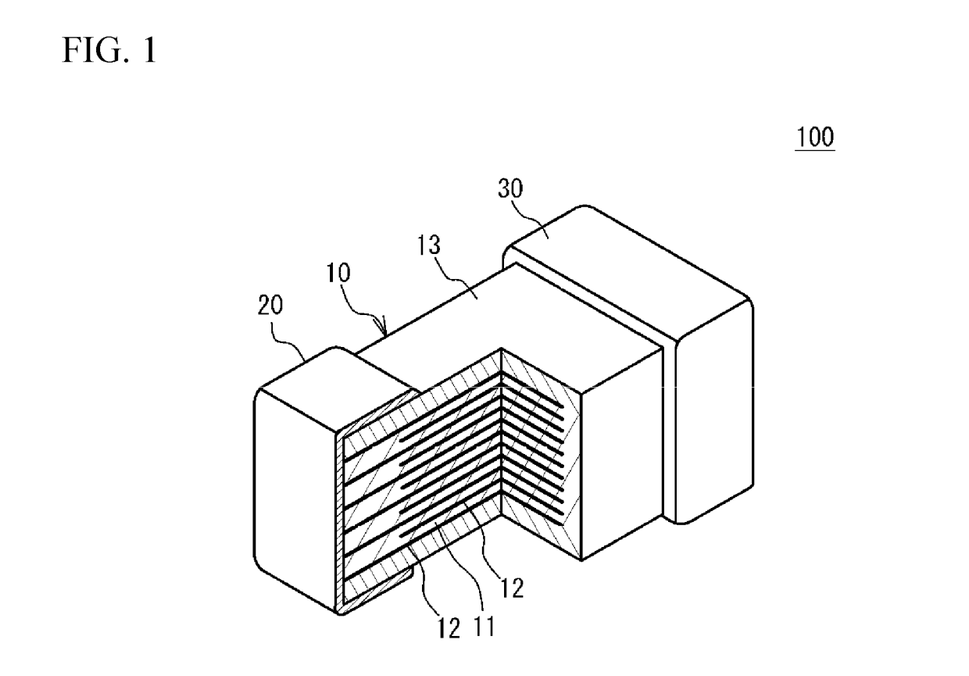
FIG. 1 illustrates a partial perspective view of a multilayer ceramic capacitor.

A description will be given of a multilayer ceramic capacitor. FIG. 1 illustrates a partial perspective view of a multilayer ceramic capacitor 100. As illustrated in FIG. 1, the multilayer ceramic capacitor 100 includes a multilayer chip 10 having a rectangular parallelepiped shape, and a pair of external electrodes 20 and 30 that are provided at edge faces of the multilayer chip 10 facing each other.

The multilayer chip 10 has a structure designed to have dielectric layers 11 and internal electrode layers 12 alternately stacked. The dielectric layer 11 includes ceramic material acting as a dielectric material. End edges of the internal electrode layers 12 are alternately exposed to a first end face of the multilayer chip 10 and a second end face of the multilayer chip 10 that is different from the first end face. In the embodiment, the first face faces with the second face. The external electrode 20 is provided on the first end face. The external electrode 30 is provided on the second end face. Thus, the internal electrode layers 12 are alternately conducted to the external electrode 20 and the external electrode 30. Thus, the multilayer ceramic capacitor 100 has a structure in which a plurality of dielectric layers 11 are stacked and each two of the dielectric layers 11 sandwich the internal electrode layer 12. In the multilayer chip 10, both end faces in the stack direction of the dielectric layers 11 and the internal electrode layers 12 (hereinafter referred to as stack direction) are covered by cover layers 13. For example, material of the cover layer 13 is the same as that of the dielectric layer 11.

For example, the multilayer ceramic capacitor 100 may have a length of 0.2 mm, a width of 0.1 mm and a height of 0.3 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the external electrodes 20 and 30 and the internal electrode layer 12 is a base metal such as nickel (Ni), copper (Cu), tin (Sn) or the like. The external electrodes 20 and 30 and the internal electrode layers 12 may be made of noble metal such as platinum (Pt), palladium (Pd), silver (Ag), gold (Au) or alloy thereof. The dielectric layer 11 is mainly composed of barium titanate ($BaTiO_3$) having a perovskite structure. The perovskite structure includes $ABO_{3-\alpha}$ having an off-stoichiometric composition.

For example, the dielectric layer 11 can be formed by baking material powder of which main component is barium titanate. When the material powder is baked, the material powder is exposed to reductive atmosphere. Therefore, oxygen defect may occur in the barium titanate. And so, in the embodiment, a donor element having a larger valence than Ti is solid-solved in the barium titanate of the dielectric layer. Thus, formation of the oxygen defect of the barium titanate is suppressed. As a result, life property of the dielectric layer 11 is improved, and reliability of the dielectric layer 11 is improved. Therefore, a high dielectric constant is achieved, and preferable bias property is achieved. It is preferable that, as the donor element of which valence is larger than that of Ti, at least one of Mo (molybdenum) and W (tungsten) is solid-solved in the barium titanate. Mo and W (for example, $Mo^{6+}$ and $W^{6+}$) having a larger valence than Ti (four) in the barium titanate is replaced to Ti site and acts as the donor element.

When total solid-solution amount of the donor element is small, maybe, the oxygen defect is not sufficiently suppressed. And so, in the embodiment, the total solid-solution amount of the donor element has a lower limit. On the other hand, when the total solid-solution amount of the donor element is large, a leak current may be excessive. And so, in the embodiment, the total solid-solution amount of the donor element has an upper limit. In concrete, in the embodiment, the total solid-solution amount of the donor element with respect to the barium titanate is 0.05 mol or more and 0.3 mol or less, on a presumption that an amount of the barium titanate is 100 mol and the donor element is converted into an oxide. It is preferable that the total solid-solution amount is 0.1 mol or more and 0.25 mol or less. It is more preferable that the total solid-solution amount is 0.1 mol or more and 0.2 mol or less.

On the other hand, when the donor element is solid-solved in the barium titanate of the dielectric layer 11, the leak current may increase. And so, an acceptor element having a smaller valence than Ti (four) and having a larger ion radius than Ti and the donor element is solid-solved in the barium titanate. The acceptor element is replaced to the Ti site. Therefore, electrical neutral is remained. Accordingly, the leak current is suppressed. It is preferable that at least one of Mn (manganese), Ni, Cu, Fe (iron), Cr (chromium), Co (cobalt), Zn (zinc), and a rare earth element (Y (yttrium), Dy (dysprosium), Ho (holmium), Er (erbium)) is used. It is specifically preferable that Mn (for example, $Mn^{2+}$) is used. The ion radius of Mo and W is smaller than the ion radius of Ti. The ion radius of the acceptor element is larger than the ion radius of Ti. Lattice strain is suppressed, a c/a value (axial ratio) of the barium titanate increases and a value close to 1.0099 that is a theoretical value of the c/a value of the barium titanate is achieved, when at least one of Mo and W is solid-solved in the barium titanate together with the acceptor element. Therefore, a crystalline of the barium titanate is improved, and the dielectric constant of the dielectric layer 11 is improved.

The ion radius is as follows. 6-coordinated Ti (+4 valence): 0.605 Å, Mn (+2 valence): 0.67 Å, Mo (+6 valence): 0.59 Å, W (+6 valence): 0.6 Å, Ni (+2 valence): 0.69 Å, Cu (+2 valence): 0.73 Å, Fe (+2 valence): 0.61 Å, Cr (+3 valence): 0.615 Å, Co (+2 valence): 0.65 Å, Zn (+2 valence): 0.74 Å, Y (+3 valence): 0.9 Å, Dy (+3 valence): 0.912 Å, Ho (+3 valence): 0.901 Å, and Er (+3 valence): 0.89 Å. These values are disclosed in "R. D. Shannon, Acta Crystallogr., A32, 751 (1976)".

When the total solid-solution amount of the acceptor element is small, it is not possible to sufficiently remain electrical neutral of the barium titanate. And so, in the embodiment, the total solid-solution amount of the acceptor element has a lower limit. On the other hand, when the total solid-solution amount of the acceptor element is large, the dielectric constant of the barium titanate may be reduced. And so, in the embodiment, the total solid-solution amount of the acceptor element has an upper limit. In concrete, in the embodiment, the total solid-solution amount of the acceptor element with respect to the barium titanate is 0.02 mol or more and 0.2 mol or less on a presumption that the amount of the barium titanate is 100 mol and the acceptor element is converted into an oxide. It is preferable that the total solid-solution amount is 0.03 mol or more and 0.15 mol or less. It is more preferable that the total solid-solution amount is 0.04 mol or more and 0.15 mol or less.

When the c/a value of the barium titanate in which the donor element and the acceptor element are solid-solved is small, the crystalline may be degraded and maybe, a high dielectric constant is not achieved. And so, in the embodiment, it is preferable that the c/a value of the barium titanate has a lower limit. For example, it is preferable that the c/a value of the barium titanate is 1.003 or more and 1.0099 or less.

Next, a description will be given of a manufacturing process of the multilayer ceramic capacitor 100. First, material powder for forming the dielectric layer 11 is prepared. The dielectric layer 11 includes Ba and Ti. These elements are included in the dielectric layer 11 in a shape of a sintered compact of the barium titanate grains.

The barium titanate is tetragonal compound having a perovskite structure and has a high dielectric constant. Generally, the barium titanate is obtained by reacting a titanium material such as titanium dioxide with a barium material such as barium carbonate and synthesizing barium titanate. Various methods can be used as a synthesizing method of the barium titanate. For example, a solid-phase method, a sol-gel method, a hydrothermal method or the like can be used.

In the embodiment, in order to evenly disperse the donor element and the acceptor element in the barium titanate of the dielectric layer 11, a compound (for example, oxide) including additive element is mixed with titanium material and barium material, and barium titanate grains in which the donor element and the acceptor element are solid-solved are synthesized by synthesizing the barium titanate. Alternatively, barium titanate of which grain diameter is sufficiently fine (high specific surface area) is synthesized in advance by a solid-phase method, a sol-gel method, or a hydrothermal method. The donor element and the acceptor element are mixed with the resulting barium titanate, and barium titanate grains in which the donor element and the acceptor element are evenly solid-solved are formed by growing the barium titanate to grains having a desirable grain diameter (reducing the specific surface area).

Figure 2:
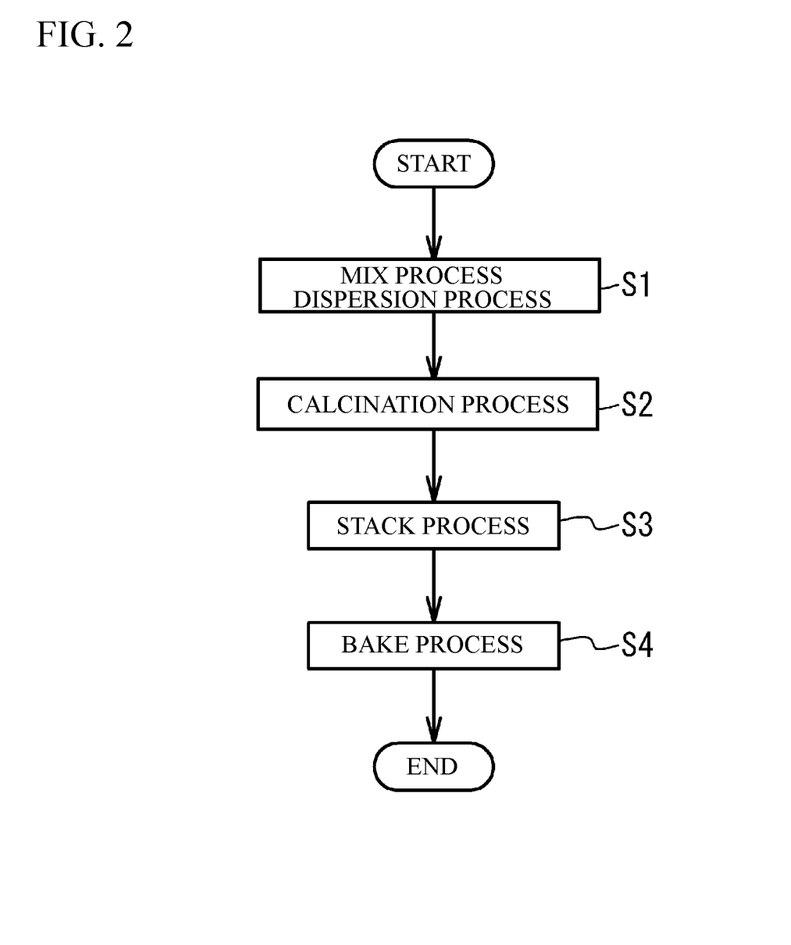
FIG. 2 illustrates a manufacturing method of the multilayer ceramic capacitor.

FIG. 2 illustrates a manufacturing method of the multilayer ceramic capacitor 100. A description will be given of a concrete manufacturing method.

(Mix and dispersion process) In a mix and dispersion process, a compound of a donor element, a compound of an acceptor element, a compound of Ba, and a compound of Ti are mixed and dispersed in an aqueous solution. When Mo is used as the donor element, ammonium molybdate $\{(NH_4)_6Mo_7O_{24} \cdot 4H_2O\}$, a molybdenum oxide ($MoO_3$) or the like can be used. When W is used as the donor element, tungsten oxide ($WO_3$) or the like can be used. When Mn is used as the acceptor element, manganese carbonate ($MnCO_3$), manganese oxide ($Mn_3O_4$), manganese citrate ($C_{12}H_{10}Mn_3O_{14}$) or the like can be used. Barium carbonate ($BaCO_3$) or the like can be used as the Ba compound. Titanium dioxide ($TiO_2$) or the like can be used as the Ti compound.

For example, the ammonium molybdate and tungsten oxide are dispersed in water. Ammonium carbonate salt is added to the aqueous solution as the dispersing agent. Barium carbonate (specific surface area is 15 $m^2/g$ or more), titanium dioxide (specific surface area is 20 $m^2/g$ or more) and manganese carbonate are added to the aqueous solution, with a Ba/Ti mol ratio of 1.001 to 1.010. And slurry is obtained. Thus, the mix and dispersion process is performed.

Total additive amount of the donor element to the barium titanate is 0.05 mol to 0.3 mol, on a presumption that the amount of the barium titanate is 100 mol and the donor element is converted into an oxide. Total additive amount of the acceptor element to the barium titanate is 0.02 mol to 0.2 mol, on a presumption that the amount of the barium titanate is 100 mol and the acceptor element is converted into an oxide. The slurry is subjected to the mix and dispersion process. In the mix and dispersion process, a ball mill, a planetary boll mill, a bead mill, a wet jet mill or the like can be used. In any mix process, it is preferable that the mixing is performed until a thermal decomposition is finished at a predetermined temperature or less in a thermal analysis measurement of the material mixed powder. When the finishing temperature of the thermal decomposition of the material mixed powder is low, it can be determined that the titanium dioxide and the barium carbonate are evenly mixed. The barium titanate having a desirable range of the specific surface area and the c/a value can be synthesized.

(Calcination process) The slurry subjected to the mix and dispersion process is dried in a temperature range of 100 to 300 degrees C. Thus, water is removed. The dried powder is calcined for 0.5 to 5 hours in a temperature range of 800 degrees C. to 1000 degrees C. Atmosphere of the calcination process is not limited. When the calcination is performed under a nitrogen flow, under air gas of which dew point is −65 degrees C. or less, under inert gas flow such as $N_2$ or He, or under a low pressure atmosphere from 10 Pa to 1000 Pa, carbonate gas generated through a solid-phase reaction is effectively removed and the reaction is uniformed. By the calcination, the donor element and the acceptor element are solid-solved in the barium titanate. From a view point of dielectric constant control, it is preferable that the c/a value (axial ratio) measured by a powder X-ray diffraction method is 1.003 or more.

It is possible to determine whether the donor element and the acceptor element are solid-solved in the barium titanate, by DSC measurement (differential scanning colorimeter) of powder. It is possible to determine that the donor element and the acceptor element are solid-solved in the barium titanate, when a transition peak temperature between a tetragonal and a cubic around 120 degrees C. is shifted toward low temperature side by 1 degrees C. or more, compared to another barium titanate in which none of the donor element and the acceptor element are solid-solved.

Additive compound may be added to the resulting barium titanate powder, in accordance with purposes. The additive compound may be MgO, $MnCO_3$, oxide of rare earth element (Y, Dy, Tm (thulium), Sm (samarium), Eu (europium) Gd (gadolinium), Tb (terbium), Ho and Er), or oxide of Cr, V (vanadium), Co, Ni, Li (lithium), B, Na (sodium), K (potassium) and Si (silicon) or the like.

The grain diameter of the barium titanate powder may be adjusted by crushing the barium titanate powder as needed. Alternatively, the grain diameter of the barium titanate powder may be adjusted by combining the crushing and classifying.

When the specific surface area of the barium titanate powder is small, grains becomes rough, and the roughness of the green sheet may be degraded. And so, it is preferable that the specific surface area of the barium titanate powder has a lower limit. On the other hand, when the specific surface area of the barium titanate powder is large, baking may be unstable, and abnormal growth of grains may occur during the sintering. And so, it is preferable that the specific surface area of the barium titanate powder has an upper limit. In concrete, in the embodiment, it is preferable that the specific surface area of the barium titanate powder is 4 $m^2/g$ or more and 25 $m^2/g$ or less.

Figure 3:
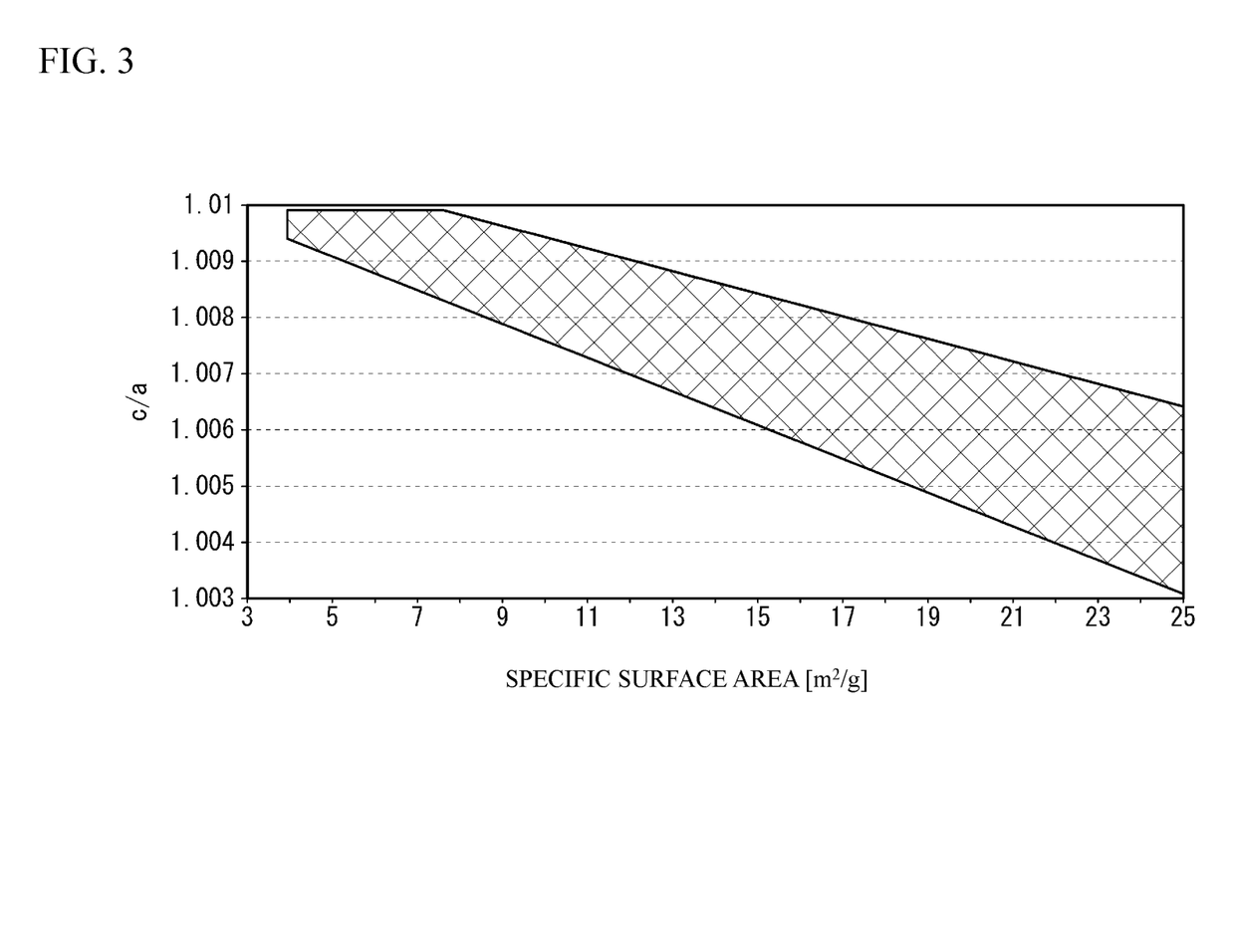
FIG. 3 illustrates a relationship between a specific surface area and a c/a value.

When the specific surface area of the barium titanate powder is small, maybe, the high dielectric constant is not achieved unless the c/a value is high. On the other hand, when the specific surface area is large, maybe, the c/a value is not sufficiently high and a necessary dielectric constant is not achieved. When the donor element is added in order to suppress oxygen defect, the c/a may be further reduced. The present inventors have learned that there is an optimal range of the specific surface area and the c/a value. In concrete, when the specific surface area of the barium titanate is "x" and the c/a value (axis ratio) is "y", the present inventors have learned that high dielectric constant is achieved in a case where the barium titanate powder has a crystal structure satisfying $y \geq -0.0003x+1.0106$, $y \leq -0.0002x+1.0114$, $4 \leq x \leq 25$ and $y \leq 1.0099$. It is possible to achieve the above-mentioned relationship between the specific surface area and the c/a value when the acceptor element having a larger ion radius than Ti is solid-solved in the barium titanate powder. The range is illustrated in FIG. 3.

Next, a binder such as polyvinyl butyral (PVB) resin, an organic solvent such as ethanol or toluene, and a plasticizer such as dioctyl phthalate (DOP) are added to the resulting barium titanate powder and wet-blended. With use of the resulting slurry, a strip-shaped dielectric green sheet substance with a thickness of 1.2 μm or less is coated on a base material by, for example, a die coater method or a doctor blade method, and then dried. Then, a metal conductive paste for the internal electrode is printed on the surface of the dielectric green sheet by screen printing or gravure printing to arrange patterns of the internal electrode layers. Thus, patterns of the internal electrode layers alternately extracted to the pair of the external electrodes are arranged. The metal may be nickel from a view point of cost. The barium titanate having an average grain diameter of 50 nm may be dispersed into the metal conductive paste, as a co-material.

(Stack process) Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations. A cover sheet, which are to be the cover layers 13, are stacked on the stacked green sheets and under the stacked sheets. The resulting compact is cut into a predetermined size (for example, 1.0 mm×0.5 mm). After that, Ni conductive pastes to be the external electrodes 20 and 30 are coated on both edge faces of the cut stack structure and are dried. Thus, a compact of the multilayer ceramic capacitor 100 is obtained.

(Bake process) The binder is removed from the resulting compact of the multilayer ceramic capacitor in $N_2$ atmosphere of a temperature range of 250 degrees C. to 500 degrees C. After that, the compact is baked for ten minutes to 2 hours in a reductive atmosphere in a temperature range of 1100 degrees C. to 1300 degrees C. Thus, each compound of the dielectric green sheet is sintered and grown into grains. In this manner, it is possible to manufacture the multilayer ceramic capacitor 100 having the multilayer structure in which the sintered dielectric layers 11 and the sintered internal electrode layers 12 are alternately stacked and the cover layers 13 formed as outermost layers in the stack direction.

In the embodiment, a re-oxidizing process may be performed in a temperature range of 600 degrees C. to 1000 degrees C.

In another embodiment of the manufacturing method of the multilayer ceramic capacitor, the external electrodes 20 and 30 may be baked separately from the dielectric layer 11. For example, after baking a multilayer structure in which a plurality of dielectric layers 11 are stacked, conductive pastes may be formed on both edge faces by baking and the external electrodes 20 and 30 may be formed. Alternatively, the external electrodes may be formed thickly on the both edge faces of the multilayer structure by a sputtering method.

Here, the effect of the embodiment is described. In the embodiment, the donor element having a larger valence than Ti is solid-solved in the barium titanate of the dielectric layer 11. The total solid-amount of the donor element solid-solved in the barium titanate is 0.05 mol or more and 0.3 mol or less, on a presumption that the amount of the barium titanate is 100 mol and the donor element is converted into an oxide. In this case, formation of oxygen defect of the barium titanate is suppressed. Thus, the life property of the dielectric layer 11 is improved and the reliability of the dielectric layer 11 is improved. And, a high dielectric constant is achieved, and preferable bias property is achieved. The acceptor element having a smaller valence than Ti and having a larger ion radius than Ti and the donor element is solid-solved in the barium titanate of the dielectric layer 11. The total solid-solution amount of the acceptor element solid-solved in the barium titanate is 0.02 mol or more and 0.2 mol or less, on a presumption that the amount of the barium titanate is 100 mol and the acceptor element is converted into an oxide. In this case, the electrical neutral is remained. Therefore, the leak current can be suppressed.

When the green sheet including the barium titanate powder in which the donor element and the acceptor element are solid-solved in advance is baked, variability of the additive element in the barium titanate in the resulting dielectric layer 11 is suppressed. Thus, the above-mentioned effect is sufficiently achieved. When the specific surface area of the barium titanate powder is "x" and the c/a value (axial ratio)

of the barium titanate powder is "y", it is preferable that the barium titanate powder has a crystal structure having relationships of y≥−0.0003x+1.0106. y≤−0.0002x+1.0114, 4≤x≤25 and y≤1.0099.

EXAMPLES

The multilayer ceramic capacitors were manufactured in accordance with the embodiment. And, characteristics of the multilayer ceramic capacitors were measured.

(Example 1) Ammonium molybdate tetrahydrate {$(NH_4)_6Mo_7O_{24}.4H_2O$} was dissolved in deionized water. And solvent was added to the aqueous solution. After that, barium carbonate (30 m²/g) and titanium dioxide (50 m²/g) were added to the aqueous solution so that the Ba/Ti molar ratio is 1. Thus, slurry was obtained. Manganese carbonate was added to the slurry. And, the slurry was mixed and dispersed with use of a bead mill. An additive amount of Mo was 0.05 mol and an additive amount of Mn was 0.02 mol, on a presumption that an amount of the barium titanate was 100 mol, Mo was converted into $MoO_3$ and Mn was converted into $MnO_2$. The resulting slurry was dried, and water was removed. After that, the slurry was calcined at a temperature of 900 degrees C., and crushing was performed. Thus, barium titanate having a specific surface area of 10 m²/g in which Mo and Mn were solid-solved was made.

The powder was dried for twenty minutes or more by flowing nitrogen gas to the powder at a temperature of 200 degrees C. After that, BET specific surface area was measured by MACsorb (HM-model 1210). The BET specific surface area was 10 m²/g.

Powder XRD measurement of the barium titanate in which Mo and Mn were solid-solved was performed with use of RIGAKU TTR III. A profile fitting was performed by performing Reitveld analysis with use of RIETAN 2000. And, the c/a value was calculated from lengths of a c-axis and an a-axis. The c/a value was 1.0094. The powder of 30 mg was tightly sealed in an aluminum pan. The temperature of the powder was increased and decreased from 100 degrees C. to 150 degrees C. at a rate of 10 degrees C./min with use of DSC (a differential scan calorimeter made by RIGAKU, thermo plus DSC 8230). The peak position during temperature decreasing was calculated. The peak position was 121 degrees C. The peak position of the barium titanate in which none of Mo and Mn were not solid-solved of a comparative example described later was 123.5 degrees C. Therefore, the peak temperature was shifted to lower temperature side by 1 degrees C. or more. That is, it was confirmed that Mo and Mn were solid-solved in the barium titanate powder.

The measurement condition of XRD is shown in Table 1.

TABLE 1

| XRD MEASUREMENT CONDITION | |
|---|---|
| ScanningMode | 2Theta/Theta |
| ScanningType | FT |
| X-Ray | 50 kV/300 mA |
| DIVERGENCE SLIT | 1/3° |
| VERTICAL DIVERGENCE LIMITATION SLIT | 10 mm |
| SCATTERING SLIT | 1/3° |
| PHOTORECEPTION SLIT | 0.15 mm |
| MONOCHROME PHOTORECEPTION SLIT | 0.8 mm |
| EMASUREMENT RANGE | 20~85° |
| STEP | 0.01 |

Next, additive material was added to the 100 mol of the barium titanate in which Mo and Mn was solid-solved so that an amount of $Ho_2O_3$ was 0.5 mol, an amount of $MnCO_3$ was 0.2 mol together with the solid-solved Mn, an amount of $V_2O_5$ was 0.1 mol, and an amount of $SiO_2$ was 1.0 mol. Barium carbonate was added to the barium titanate so that a Ba/Ti molar ratio (a molar ratio of Ba to Ti in total of barium titanate in which Mo and Mn were solid-solved, the added barium carbonate and added titanium dioxide) was 1.000. And a solvent was added to the barium titanate. And slurry was obtained. PVB binder was added to the slurry. And a green sheet having a thickness of 1.2 μm was coated on a PET film.

Next, Ni conductive paste was printed on the green sheet, as an internal electrode. With use of the printed green sheet, a multilayer ceramic capacitor having 400 layers was manufactured. The multilayer capacitor had a length of 1.0 mm, a width of 0.5 mm and a height of 0.5 mm. After removing the binder, the printed green sheets were baked in a reductive atmosphere of 1200 degrees C. And a re-oxidizing process was performed in $N_2$ atmosphere at a temperature of 800 degrees C. A thickness of the dielectric layer after the baking was 0.8 μm, and a thickness of the internal electrode was 0.9 μm.

The amounts of Mo and Mn included in the dielectric layer were measured by ICP. It was confirmed that an amount of Mo was 0.05 mol and an amount of Mn was 0.02 mol on a presumption that an amount of the barium titanate was 100 mol, Mo was converted into $MoO_3$, and Mn was converted into $MnO_2$.

(Examples 2, 7 and 8) In examples 2, 7 and 8, the amounts of Mo and Mn that were solid-solved in the barium titanate powder in advance were changed. In the example 7, Mn was further added to the barium titanate powder without solid-solving. Other conditions were the same as the first embodiment. It was confirmed that the DSC peak temperature of the barium titanate powder of the examples 2, 7 and 8 in which Mo and Mn were solid-solved in advance was shifted toward lower temperature side by 1 degrees C. or more, compared to the barium titanate of the comparative example 1.

(Examples 3 to 5) In examples 3 to 5, the amounts of Mo and Mn solid-solved in the barium titanate powder in advance were 0.2 mol and 0.04 mol, on a presumption that the amount of the barium titanate was 100 mol, Mo was converted into $MoO_3$, and Mn was converted into $MnO_2$. In the example 3, the temperature of synthesizing was 950 degrees C. In the example 4, the temperature of synthesizing was 1000 degrees C. and the BET value was 4 by enhancing crushing. In the example 5, the specific surface area of $TiO_2$ was 300 m²/g and the temperature of synthesizing was 800 degrees C. In the examples 3 to 5, Mn was further added to the barium titanate powder without solid-solving. Other conditions were the same as the example 1. It was confirmed that the DSC peak temperature of the barium titanate powder of the examples 3 to 5 in which Mo and Mn were solid-solved in advance was shifted toward lower temperature side by 1 degrees C. or more, compared to the barium titanate of the comparative example 1.

(Example 6) In an example 6, $WO_3$ powder was used instead of the Mo material. The amounts of W and Mn solid-solved in the barium titanate powder in advance were 0.2 mol and 0.04 mol, on a presumption that the amount of the barium titanate was 100 mol, W was converted into $WO_3$, and Mn was converted into $MnO_2$. In the example 6, Mn was further added to the barium titanate powder without solid-solving. Other conditions were the same as the example 1.

(Examples 9 to 11) In examples 9 to 11, the amounts of Mo and Mn solid-solved in the barium titanate powder in advance were 0.2 mol and 0.04 mol, on a presumption that the amount of the barium titanate was 100 mol, Mo was converted into $MoO_3$, and Mn was converted into $MnO_2$. In the example 9, the temperature of synthesizing was 1020 degrees C. In the example 10, the barium titanate was synthesized by using $TiO_2$ having a specific surface area of 7 $m^2/g$, and the temperature of synthesizing was 920 degrees C. In the example 11, barium titanate having the specific surface area of 50 $m^2/g$ was used as the raw material. The barium titanate was not made from $BaCO_3$ and $TiO_2$ but made by hydrothermal synthesizing. The raw material was thermally treated at a temperature of 800 degrees C. And, barium titanate of 20 $m^2/g$ in which Mo and Mn were solid-solved was made. In the examples 9 to 11, Mn was further added to the barium titanate powder without solid-solving. Other conditions were the same as the first example 1.

(Analysis) Table 2 and Table 3 show measured results (the amounts of Mo, W and Mn solid-solved in the barium titanate in advance, the amounts of Mo and Mn added to the barium titanate without solid-solving, the specific surface area, the c/a value, a relative dielectric constant ε, a high-temperature acceleration life value, a leak current value). The relative dielectric constant c was calculated by calculating a capacitance of the multilayer ceramic capacitor under conditions of 25 degrees C., 1 kHz and 0.55 Vrms/μm. The life was high-acceleration life value before insulation resistivity (p) becomes 1×1010 Ωcm under a direct current electrical field of 10V/μm at a temperature of 125 degrees C. The leak current after five minutes from the start of the high-temperature acceleration was measured.

TABLE 2

| | SOLID-SOLVED IN ADVANCE (mol) | | ADDITIONALLY ADDED (mol) | | BET |
|---|---|---|---|---|---|
| | Mo or W | Mn | Mo or W | Mn | ($m^2/g$) |
| EXAMPLE 1 | Mo 0.05 | Mn 0.02 | — | 0.18 | 10 |
| EXAMPLE 2 | Mo 0.05 | Mn 0.2 | — | — | 10 |
| EXAMPLE 3 | Mo 0.2 | Mn 0.04 | — | 0.16 | 7 |
| EXAMPLE 4 | Mo 0.2 | Mn 0.04 | — | 0.16 | 4 |
| EXAMPLE 5 | Mo 0.2 | Mn 0.04 | — | 0.16 | 25 |
| EXAMPLE 6 | W 0.2 | Mn 0.04 | — | 0.16 | 10 |
| EXAMPLE 7 | Mo 0.3 | Mn 0.02 | — | 0.18 | 10 |
| EXAMPLE 8 | Mo 0.3 | Mn 0.2 | — | — | 10 |
| EXAMPLE 9 | Mo 0.2 | Mn 0.04 | — | 0.16 | 3.5 |
| EXAMPLE 10 | Mo 0.2 | Mn 0.04 | — | 0.16 | 4 |
| EXAMPLE 11 | Mo 0.2 | Mn 0.04 | — | 0.16 | 20 |
| COMPARATIVE EXAMPLE 1 | — | — | Mo 0.2 | 0.20 | 10 |
| COMPARATIVE EXAMPLE 2 | — | — | — | 0.20 | 10 |
| COMPARATIVE EXAMPLE 3 | Mo 0.2 | — | — | 0.20 | 10 |
| COMPARATIVE EXAMPLE 4 | Mo 0.3 | Mn 0.25 | — | — | 10 |
| COMPARATIVE EXAMPLE 5 | Mo 0.05 | Mn 0.01 | — | — | 10 |
| COMPARATIVE EXAMPLE 6 | Mo 0.04 | Mn 0.04 | — | 0.16 | 10 |
| COMPARATIVE EXAMPLE 7 | Mo 0.35 | Mn 0.04 | — | 0.16 | 10 |
| REFERENCE RANGE | 0.05~0.3 | 0.02~0.2 | — | — | — |

TABLE 3

| | c/a VALUE | ε | LIFE TIME (minute) | LEAK CURRENT (μA) |
|---|---|---|---|---|
| EXAMPLE 1 | 1.0094 | 3800 | 35500 | 20 |
| EXAMPLE 2 | 1.0085 | 3800 | 34000 | 0.01 |
| EXAMPLE 3 | 1.0099 | 4100 | 67000 | 1 |
| EXAMPLE 4 | 1.0094 | 4000 | 49100 | 2 |
| EXAMPLE 5 | 1.003 | 2800 | 71000 | 0.8 |
| EXAMPLE 6 | 1.008 | 3500 | 64800 | 10 |
| EXAMPLE 7 | 1.008 | 2900 | 73000 | 39 |
| EXAMPLE 8 | 1.0076 | 2700 | 71200 | 3 |
| EXAMPLE 9 | 1.0099 | 4500 | 12000 | 2 |
| EXAMPLE 10 | 1.0092 | 11000 | 18000 | 0.9 |
| EXAMPLE 11 | 1.0028 | 9000 | 19000 | 0.7 |
| COMPARATIVE EXAMPLE 1 | 1.0088 | 3880 | 10000 | 6 |
| COMPARATIVE EXAMPLE 2 | 1.0088 | 3900 | 8100 | 0.07 |
| COMPARATIVE EXAMPLE 3 | 1.0087 | 3830 | 69000 | 480 |
| COMPARATIVE EXAMPLE 4 | 1.0077 | 2400 | 72400 | 0.5 |
| COMPARATIVE EXAMPLE 5 | 1.0092 | 3900 | 37000 | 110 |
| COMPARATIVE EXAMPLE 6 | 1.0091 | 4100 | 9000 | 14 |
| COMPARATIVE EXAMPLE 7 | 1.0085 | 2900 | 70500 | 910 |
| REFERENCE RANGE | — | 2500 OR MORE | 12000 OR MORE | 100 OR LESS |

As shown in Table 2 and Table 3, in any of the examples 1 to 11, high relative dielectric constant was achieved, and the life was elongated. This is because the donor element of 0.05 mol or more was solid-solved in the barium titanate of the dielectric layer 11 and the acceptor element of 0.2 mol or more was solid-solved in the barium titanate of the dielectric layer 11, on a presumption that the amount of the barium titanate was 100 mol and the donor element and the acceptor element were converted into oxides. And, in any of the examples 1 to 11, the leak current was suppressed. This is because the acceptor element of 0.02 mol or more having a smaller valence than Ti and having a larger ion radius than Ti and the donor element was solid-solved in the barium titanate of the dielectric layer 11, and the donor element of 0.3 mol or more having a larger valence than Ti was solid-solved in the barium titanate, on a presumption that the amount of the barium titanate was 100 mol and the acceptor element and the donor element were converted into oxides.

When the example 1 is compared with the example 2 of which specific surface area is the same as the example 1, the total additive amount of Mn of the example 1 (0.2 mol) is the same as that of the example 2. However, the leak current of the example 2 was suppressed more than the example 1. When the example 7 is compared with the example 8 of which specific surface area is the same as the example 7, the total additive amount of Mn of the example 7 (0.2 mol) is the same as that of the example 8. However, the leak current of the example 8 was suppressed more than the example 7. This is because the additive element was evenly diffused in the barium titanate by solid-solving the additive element in the barium titanate in advance.

Compared to the example 9, the life was further elongated to 20 thousands minutes or more in the other examples. This is because degradation of the roughness of the green sheet was suppressed because the specific surface area of the barium titanate powder was 4 $m^2/g$ or more.

Compared to the examples 10 and 11, the life was further elongated and the relative dielectric constant was within the preferable range of 2500 to 5000 in the other examples except for the example 9. This is because the relationship between the c/a value and the specific surface area was within the range of FIG. 3 and high crystalline was achieved.

(Comparative examples 1 and 2) In comparative examples 1 and 2, barium titanate, in which none of the donor element having a larger valence than Ti and the acceptor element having a smaller valence than Ti and having a larger ion radius than Ti and the donor element were not solid-solved, was used. In the comparative example 1, Mo and Mn were added without solid-solving. In the comparative example 2, only Mn was added without solid-solving. Other conditions were the same as the example 1. In the comparative examples 1 and 2, sufficient life was not achieved. This is because Mo was not sufficiently solid-solved in the barium titanate even if Mo was added to the barium titanate.

(Comparative example 3) In a comparative example 3, barium titanate in which only Mo of Mo and Mn was solid-solved was made, and Mn was added to the barium titanate without solid-solving. The other conditions were the same as the example 1. In the comparative example 3, the leak current was not sufficiently suppressed. This is because Mn was not sufficiently solid-solved in the barium titanate even if Mn was additionally added although Mo was solid-solved in the barium titanate in advance.

(Comparative example 4) In a comparative example 4, the amounts of Mo and Mn that were solid-solved in the barium titanate were 0.3 mol and 0.25 mol, on a presumption that the amount of the barium titanate was 100 mol, Mo was converted into $MoO_3$ and Mn was converted into $MnO_2$. The other conditions were the same as the example 1. In the comparative example 4, high relative dielectric constant was not achieved. This is because the amount of Mn solid-solved in the barium titanate in advance was large.

(Comparative example 5) In a comparative example 5, the amounts of Mo and Mn that were solid-solved in the barium titanate were 0.05 mol and 0.01 mol, on a presumption that the amount of the barium titanate was 100 mol, Mo was converted into $MoO_3$ and Mn was converted into $MnO_2$. The other conditions were the same as the example 1. In the comparative example 5, the leak current was not sufficiently suppressed. This is because the amount of Mn solid-solved in the barium titanate was small.

(Comparative example 6) In a comparative example 6, the amounts of Mo and Mn that were solid-solved in the barium titanate were 0.04 mol and 0.04 mol, on a presumption that the amount of the barium titanate was 100 mol, Mo was converted into $MoO_3$ and Mn was converted into $MnO_2$. The other conditions were the same as the example 1. In the comparative example 6, long life was not achieved. This is because Mn was not sufficiently solid-solved in the barium titanate even if Mn was additionally added.

(Comparative example 7) In a comparative example 7, the amounts of Mo and Mn that were solid-solved in the barium titanate were 0.35 mol and 0.04 mol, on a presumption that the amount of the barium titanate was 100 mol, Mo was converted into $MoO_3$ and Mn was converted into $MnO_2$. Moreover, Mn was additionally added to the barium titanate. The other conditions were the same as the example 1. In the comparative example 7, the leak current was not sufficiently suppressed. This is because the amount of Mo solid-solved in the barium titanate in advance was large.

Although the embodiments of the present invention have been described in detail, it is to be understood that the various change, substitutions, and alterations could be made hereto without departing from the spirit and scope of the invention.

What is claimed is:

1. A manufacturing method of ceramic powder comprising:
    mixing a barium carbonate having a specific surface are of 15 $m^2$/g or more, a titanium dioxide having a specific surface area of 20 $m^2$/g or more, a first compound of a donor element having a larger valence than Ti, and a second compound of an acceptor element having a smaller valence than Ti and having a larger ion radium than Ti and the donor element; and
    synthesizing barium titanate powder by calcining the barium carbonate, the titanium dioxide, the first compound and the second compound until a specific surface area of the barium titanate powder becomes 4 $m^2$/g or more and 25 $m^2$/g or less,
    wherein:
    a solid solution amount of the donor element with respect to the barium titanate is 0.05 mol or more and 0.3 mol or less on a presumption that an amount of the barium titanate is 100 mol and the donor element is converted into an oxide;
    a solid solution amount of the accepter element with respect to the barium titanate is 0.02 mol or more and 0.2 mol or less on a presumption that the amount of the barium titanate is 100 mol and the acceptor element is converted into an oxide; and
    relationships $y \geq -0.0003x+1.0106$, $y \leq -0.0002x+1.0114$, $4 \leq x \leq 25$ and $y \leq 1.0099$ are satisfied when a specific surface area of the ceramic powder is "x" and an axial ratio c/a of the ceramic powder is "y".

2. The method as claimed in claim 1, wherein the barium titanate powder is synthesized by solid-phase synthesizing barium carbonate and titanium dioxide together with the donor element and the acceptor element.

3. The method as claimed in claim 1, wherein the donor element is at least one of Mo and W.

4. The method as claimed in claim 1, wherein the acceptor element is Mn.

* * * * *

UNITED STATES PATENT AND TRADEMARK OFFICE
CERTIFICATE OF CORRECTION

| | |
|---|---|
| PATENT NO. | : 11,756,736 B2 |
| APPLICATION NO. | : 17/501817 |
| DATED | : September 12, 2023 |
| INVENTOR(S) | : Chie Kawamura, Kazumichi Hiroi and Osamu Hattori |

It is certified that error appears in the above-identified patent and that said Letters Patent is hereby corrected as shown below:

In the Claims

At Column 14, Line 18, in Claim 1, the phrase "a specific surface are" should be --a specific surface area--.

Signed and Sealed this
Twelfth Day of December, 2023

*Katherine Kelly Vidal*

Katherine Kelly Vidal
*Director of the United States Patent and Trademark Office*